(12) United States Patent
Woll et al.

(10) Patent No.: US 7,073,465 B2
(45) Date of Patent: Jul. 11, 2006

(54) METHOD AND DEVICE FOR OPERATING AN INTERNAL COMBUSTION ENGINE

(75) Inventors: Christoph Woll, Gerlingen (DE); Richard Hotzel, Stuttgart (DE); Ralf Buehrle, Leonberg (DE); Lanouar Chouk, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/201,640

(22) Filed: Aug. 10, 2005

(65) Prior Publication Data

US 2006/0032213 A1 Feb. 16, 2006

(30) Foreign Application Priority Data

Aug. 10, 2004 (DE) .................. 10 2004 038 731

(51) Int. Cl.
*F02D 2/08* (2006.01)

(52) U.S. Cl. .................. 123/1 A; 123/325; 123/434; 123/568.16; 73/118.2; 73/117.3; 60/274; 701/108

(58) Field of Classification Search .............. 123/1 A, 123/235, 434; 73/117.2, 117.3, 118.2; 60/274
See application file for complete search history.

(56) References Cited

U.S. PATENT DOCUMENTS 6,116,208 A * 9/2000 Nishimura et al. ......... 123/295
6,185,930 B1 * 2/2001 Lepperhoff et al. ........... 60/274

FOREIGN PATENT DOCUMENTS

| DE | 197 39 848 | 3/1999 |
|---|---|---|
| DE | 198 43 879 | 4/2000 |
| DE | 100 41 073 | 8/2001 |
| DE | 100 36 453 | 2/2002 |
| DE | 101 15 750 | 9/2002 |
| DE | 103 13 216.3 | 10/2004 |
| WO | WO 02/14659 | 2/2002 |

* cited by examiner

*Primary Examiner*—Willis R. Wolfe
*Assistant Examiner*—Johnny H. Hoang
(74) *Attorney, Agent, or Firm*—Kenyon & Kenyon LLP

(57) ABSTRACT

A method and device for operating an internal combustion engine, which diagnose and/or adapt the exhaust-gas recirculation system for, in particular, multibranch internal combustion engines. In this context, the internal combustion engine includes at least one adsorption catalyst in at least one exhaust branch. In addition, at least one exhaust-gas recirculation duct is provided, which is equipped with an exhaust-gas recirculation valve and feeds exhaust gas from the at least one exhaust branch back into at least one air-supply duct, a level of pollutant stored in the at least one adsorption catalyst being ascertained in a first operating state of the internal combustion engine when the exhaust-gas recirculation valve is at least partially open, so that a first value for the pollutant level is produced. In a second operating state of the internal combustion engine, a second value for the pollutant level in the at least one adsorption catalyst is ascertained when exhaust-gas recirculation valve is closed. The first value of the pollutant level is compared to the second value of the pollutant level. A diagnosis and/or an adaptation of an exhaust-gas recirculation system formed by the at least one exhaust-gas recirculation duct, along with its exhaust-gas recirculation valve and its drive circuit, is carried out as a function of the comparison result.

8 Claims, 2 Drawing Sheets

METHOD AND DEVICE FOR OPERATING AN INTERNAL COMBUSTION ENGINE

FIELD OF THE INVENTION

The present invention relates to a method and a device for operating an internal combustion engine.

BACKGROUND INFORMATION

Internal combustion engines, which operate with a lean mixture, i.e., at a lambda value greater than 1, in phases, are generally provided with an external exhaust-gas recirculation system. Using an exhaust-gas recirculation duct that leads into the intake manifold of the internal combustion engine, burned air/fuel mixture from an exhaust branch of the internal combustion engine is mixed with fresh air supplied to the engine. The amount of recirculated exhaust gas is controlled by an exhaust-gas recirculation valve in the exhaust-gas recirculation duct.

The external exhaust-gas recirculation system may be affected by various disturbances. For example, the exhaust-gas recirculation duct may be narrowed by deposits of soot, oil residues, or condensate. Since an incorrect amount or an excess of recirculated exhaust gas may negatively affect the NOx emissions of the internal combustion engine and changes the torque generated by the internal combustion engine, an adaptation of the exhaust-gas recirculation is frequently carried out by the electronic engine control unit, with the goal of compensating for the soiling of the exhaust-gas recirculation duct by correcting the degree of opening of the exhaust-gas recirculation valve. In addition, legislation requires an on-board diagnosis of the exhaust-gas recirculation system, the diagnosis generating an error message in the case of disturbances having a negative effect on emissions.

German Patent Applications DE 100 41 073 A1 and DE 101 15 750 A1 describe a method for adapting and diagnosing the exhaust-gas recirculation system, where the intake-manifold pressure is measured, on one hand, by a pressure sensor. On the other hand, the intake-manifold pressure is modeled in view of the degree of opening of the exhaust gas recirculation valve and additional parameters, such as the engine speed, the degree of opening of the throttle valve, the camshaft position, and the effect of a fuel-tank vent line. A malfunction of the exhaust-gas recirculation system may be deduced from the difference between the measured and the modeled value of the intake-manifold pressure.

Conventionally, internal combustion engines, which are operated with a lean mixture, are equipped with adsorption catalysts, in particular NOx-adsorption catalysts. This is particularly the case with spark-ignition engines, which have direct gasoline injection and are driven using stratified operation.

Adsorption catalysts have the characteristic that the stored pollutant, e.g., NOx, must be discharged with the aid of periodic, brief, rich operation, i.e., operation of the internal combustion engine at a lambda value less than 1. This is referred to as regeneration. The engine control unit triggers instances of regeneration under various circumstances, in particular when it is detected that the NOx trap of the adsorption catalyst is full. If an NOx sensor is installed downstream from the adsorption catalyst, then, e.g., the engine control unit detects a full NOx trap, when the NOx sensor measures a high NOx concentration greater than a first threshold value or a high NOx mass flow rate greater than a second threshold value in the exhaust gas leaving the adsorption catalyst. It is also convention for the engine control unit to model the NOx level of the NOx trap of the adsorption catalyst on the basis of a modeled NOx concentration in the untreated exhaust gas upstream from the adsorption catalyst. The end of regeneration is a function of the signal of the sensor, which is downstream from the adsorption catalyst and may be, as described, an NOx sensor or an oxygen sensor having a two-point characteristic. The regeneration is ended, when the sensor detects that no more NOx is discharged from the NOx trap of the adsorption catalyst, but rather that the rich exhaust gas supplied to the adsorption catalyst for regenerating the NOx trap of the adsorption catalyst flows through the adsorption catalyst substantially unaltered.

In this case, e.g., an oxygen sensor, which has a two-point characteristic and is positioned downstream from the catalyst, would rapidly switch from detecting a lean exhaust gas to detecting the exhaust gas, which is now rich and no longer needed for regeneration. According to today's state of the art, even NOx sensors output, in addition to the NOx-concentration signal, a signal which has a two-point characteristic and may be used for ending the regenerating phase.

A method and a model for modeling a discharge phase of a nitrogen-oxide adsorption catalyst are described in PCT Application WO 02/14659. In the case of internal combustion engines, which can be operated with a lean fuel-air mixture (lambda greater than 1), NOx adsorption catalysts are used in order to store the emitted NOx expelled by the internal combustion engine during lean operation. In this case, the NOx adsorption catalyst is in the so-called storage phase. The efficiency of the NOx adsorption catalyst decreases with increasing duration of the storage phase, which leads to an increase in the NOx emissions in back of the NOx adsorption catalyst. The reason for the reduction in the efficiency is the increase in the nitrogen oxide (NOx) level of the NOx adsorption catalyst. The NOx level can be monitored, and after a specifiable threshold value is exceeded, a discharge phase or regenerating phase of the NOx adsorption catalyst can be initiated. A nitrogen oxide (NOx) storage model can be used for determining the NOx level of the NOx adsorption catalyst. NOx storage models are generally conventional. In an NOx storage model, the NOx level can be modeled from the parameters describing the operating point of the internal combustion engine (e.g., the supplied mass of fuel or mass of air, the torque, etc.).

During the discharge phase, a reducing agent, which reduces stored nitrogen oxides to nitrogen (N2) and carbon dioxide (CO2), is added to the exhaust gas of the internal combustion engine. For example, hydrocarbons (HC), carbon monoxide (CO), and/or hydrogen (H2), which can be produced in the exhaust gas using a rich setting of the fuel-air mixture (homogeneous operation of the internal combustion engine), can be used as reducing agents. HC, CO, and H2 are also referred to as rich gases. As an alternative, urea can also be added to the exhaust gas as a reducing agent. In this context, ammonia from the urea is used to reduce the nitrogen oxide to nitrogen and carbon dioxide. The ammonia may be recovered from a urea solution by hydrolysis.

Towards the end of the discharge phase, a large part of the stored nitrogen oxide is reduced and less and less of the reducing agent encounters nitrogen oxide, which it can reduce to nitrogen and carbon dioxide. As a result, the concentration of reducing agent in the exhaust gas in back of the NOx adsorption catalyst increases towards the end of the discharge phase, and the concentration of oxygen in the exhaust gas in back of the NOx adsorption catalyst decreases. By analyzing the exhaust gas in back of the NOx adsorption catalyst with the aid of suitable exhaust-gas sensors (e.g., O2 sensor or NOx sensor), the end of the discharge phase may then be initiated when the majority of the nitrogen oxide has been discharged from the NOx adsorption catalyst. In addition, the NOx level of the NOx adsorption catalyst can be determined with the aid of a discharge model, and that the end of the discharge phase can therefore be determined with the support of a model.

The end of the regenerating phase should be determined as accurately as possible, since a regenerating phase that is too short does not completely empty the NOx adsorption catalyst and the NOx emissions consequently increase. On the other hand, a regenerating phase that is too long results in an increase of reducing-agent emissions (rich gases or urea). Both an increase in the NOx emissions and an increase in the reducing-agent emissions are environmentally harmful and should therefore be reduced to a minimum.

The use of suitable exhaust-gas sensors for analyzing the exhaust gas in back of the NOx adsorption catalyst and determining the end of a regenerating phase is relatively complicated and expensive. In the case of the model-based method for determining the end of the regenerating phase, a mass flow rate of reducing agent is determined from the composition (lambda) of the fuel-air mixture and the mass flow rate of air supplied to the internal combustion engine for combustion. Using a temperature-dependent factor, this is converted to a mass flow rate, as a function of which a reduction in the NOx stored in the NOx adsorption catalyst during lean operation of the internal combustion engine is calculated.

This modeling has the disadvantage that it is relatively inaccurate and only conditionally useful for determining the end of a regenerating phase. The reason for this is, in particular, that during the regenerating phase, the reducing agent, in addition to reducing the stored NOx, reduces O2 that is also stored. The stored gas, NOx or O2, which is then actually reduced at a particular time during the regenerating phase, is a function of the construction type of the NOx adsorption catalyst. Therefore, the discharge model known from the related art does not allow one to deduce which gas is reduced at which time, and by how much, during the regenerating phase.

In this context, PCT Application WO 02/14659 describes that the O2 trap is modeled by a first integrator for oxygen (O2) and the NOx trap is modeled by a second integrator for nitrogen oxides (NOx), and that the first integrator and the second integrator are proportionally acted upon by the reducing-agent mass flow rate in accordance with a distribution factor, the distribution factor being ascertained as a function of the content of the O2 trap and the content of the NOx trap of the NOx adsorption catalyst. In so doing, the mass flow rate of reducing agent is ascertained from the composition of the fuel-air mixture and a mass flow rate of air supplied to the internal combustion engine for combustion. The temperature in the NOx adsorption catalyst may be taken into account during the determination of the O2 storage capacity of the O2 trap. The following processes take place during the regenerating phase of the adsorption catalyst: the reducing agent reduces the stored nitrogen oxides to nitrogen and carbon dioxide. These substances exit the catalyst, which means that an excess of oxygen occurs in back of the catalyst during the regenerating phase, although the internal combustion engine is operated with a rich fuel-air mixture and, therefore, oxygen deficiency.

German Patent Application No. DE 198 43 879 A1 describes a method for operating an internal combustion engine, in whose exhaust region an NOx adsorption catalyst is situated. In a first operating phase in which the internal combustion engine is driven with a lean mixture in the scope of a stratified cylinder charge, the produced NOx is stored in the NOx adsorption catalyst. In a second operating phase in which the internal combustion engine is operated with a stoichiometric or rich mixture within the scope of a homogeneous cylinder charge, the NOx adsorption catalyst is regenerated. An NOx sensor situated in back of the NOx adsorption catalyst detects an increasing NOx concentration in the exhaust gas during the storage phase. A shift into the regenerating phase is initiated, as soon as the NOx concentration exceeds a predefined threshold value. In other exemplary embodiments, a shift occurs from the storage phase to the regenerating phase, when the mass flow rate of NOx or the integral of the mass flow rate of NOx in back of the NOx adsorption catalyst exceeds a predefined threshold value in the storage phase. The mass flow rate of NOx in back of the NOx adsorption catalyst may be calculated from the NOx-Sensor signal, the mass flow rate of exhaust gas, which may be determined, for example, from the measured mass flow rate of intake air, and a constant factor that represents the molar mass.

German Patent Application No. DE 197 39 848 A1 also describes a method for operating an internal combustion engine, in whose exhaust region an NOx adsorption catalyst is situated. A shift from the storage phase to the regeneration phase is undertaken as a function of the mass of NOx stored in the NOx adsorption catalyst. The mass is determined from the integral of the NOx mass flow rate, which is obtained from the measured air mass flow rate or from the known load of the internal combustion engine. If desired, the speed of the internal combustion engine and/or the exhaust-gas lambda and/or the catalyst temperature and/or the saturation behavior of the catalyst may be taken into account, as well.

German Patent Application No. DE 100 36 453 A1 also describes a method for operating an internal combustion engine, in whose exhaust region an NOx adsorption catalyst is situated. The shift from the storage phase to the regenerating phase occurs as a function of the mass of NOx stored in the NOx adsorption catalyst. The mass flow rate of NOx occurring in back of the NOx adsorption catalyst is both calculated on the basis of a model of the NOx adsorption catalyst and ascertained from the signal of an NOx sensor. The model of the NOx adsorption catalyst is corrected by comparing the two mass flow rates.

German Patent Application No. DE 103 13 216.3 describes a method for operating a nitrogen-oxide adsorption catalyst situated in the exhaust region of an internal combustion engine, where the correct time at which a shift should be made from a storage phase into a regeneration phase is ascertained. In this context, the mass of NOx actually stored in the NOx adsorption catalyst or the mass flow rate of NOx occurring in back of the NOx adsorption catalyst may be ascertained in the storage phase with comparably high accuracy, with the aid of an integrator.

An adsorption catalyst is a component, which is relevant to the exhaust gas and must be diagnosed. To this end, the NOx storage capacity of the adsorption catalyst is determined. As described, two measuring methods are generally known for this:

According to a first method, a full NOx reservoir can be detected, as described, e.g., with the aid of an NOx sensor downstream from the adsorption catalyst. The level of NOx present in the adsorption catalyst at this instant is modeled, for example, as described in PCT Application WO02/14659 A1. Consequently, the level of NOx stored in the adsorption catalyst during the storage phase, i.e. during lean operation of the internal combustion engine is ascertained by the first method.

PCT Application WO02/14659 A1 also describes that the end of the regenerating phase can be ascertained with the aid of the mass flow rate of the reducing-agent necessary for the regeneration of the adsorption catalyst, the oxygen storage capacity of the adsorption catalyst being taken into consideration with the aid of a distribution factor.

In addition, internal combustion engines having a two-branch exhaust system are conventional, where, in each instance, an exhaust-gas recirculation duct having its own exhaust-gas recirculation valve runs out of both exhaust-gas banks and returns to the intake manifold. In such a system, the problem of separately adapting or diagnosing the soiling of the two exhaust-gas recirculation ducts or the two exhaust-gas recirculation valves has not been solved to date. Using the above-described, conventional methods for diagnosing and/or adapting the exhaust-gas recirculation system, to date, it has only been possible to adapt or diagnose the entire exhaust-gas recirculation system. However, an incorrect amount or an excess of recirculated exhaust gas cannot be specifically attributed to the malfunction of one of the two exhaust-gas recirculation valves.

SUMMARY

A method and device according to an example embodiment of the present invention for operating an internal combustion engine may have the advantage over the related art that, in a first operating state of the internal combustion engine, a level of pollutant stored in at least one adsorption catalyst is ascertained when the exhaust-gas recirculation valve is at least partially open, so that a first value for the pollutant level is produced; that, in a second operating state of the internal combustion engine, a second value for the pollutant level in the at least one adsorption catalyst is ascertained when the exhaust-gas recirculation valve is closed; that the first value for the pollutant level is compared to the second value for the pollutant level; and that a diagnosis and/or an adaptation of an exhaust-gas recirculation system, which is formed by the at least one exhaust-gas recirculation duct, along with its exhaust-gas recirculation valve and its drive circuit, is carried out as a function of the comparison result. In this manner, a diagnosis and/or an adaptation of the exhaust-gas recirculation system may be executed with the aid of the level of pollutant stored in the at least one adsorption catalyst. This may be particularly advantageous when a multibranch exhaust system having several exhaust-gas recirculation ducts and exhaust-gas recirculation valves is present. For, in this case, not only may a defect in the exhaust-gas recirculation system be detected in general, but it may also be determined if the defect in the exhaust-gas recirculation system was caused by several or only one of the exhaust-gas recirculation valves, and in the latter case, by which valve.

A defect in the exhaust-gas recirculation system may be detected particularly easily, when the absolute value of the deviation of the first value of the pollutant level from the second value of the pollutant level is greater than a first predefined threshold value. This may also have the advantage that tolerances of the exhaust-gas recirculation system caused by, e.g., components, or deviations or inaccuracies, which solely result on the basis of the different determination methods used for ascertaining the first and the second values of the pollutant level, are taken into account during the defect detection of the exhaust-gas recirculation system, as long as the first predefined threshold value is suitably selected. Therefore, a defective exhaust-gas recirculation system is not detected solely on the basis of measuring or determination inaccuracies or on the basis of differences in the methods used for ascertaining the first value and the second value of the pollutant level, and also not on the basis of tolerances of the exhaust-gas recirculation system caused by component parts.

When using several exhaust branches having one exhaust-gas recirculation duct each, asymmetric exhaust-gas recirculation via the different exhaust-gas recirculation ducts may be detected in a particularly simple manner, when the difference between the first value of the pollutant level and the second value of the pollutant level is different for at least two of the exhaust-gas recirculation ducts.

In addition, tolerances of the utilized measuring or determination methods for ascertaining the first value and the second value of the pollutant level, and differences between the different exhaust-gas recirculation ducts and exhaust-gas recirculation valves caused by components, may be taken into account again, if the asymmetry of the exhaust-gas recirculation is only detected when the absolute value of the difference of the difference exceeds a second, predefined threshold value.

A further advantage may be attained when, in a first step, a diagnosis of the exhaust-gas recirculation system is carried out as a function of a pressure in the at least one air-supply duct; and when, only for the case in which a defect of the exhaust-gas recirculation system is detected during this diagnosis, it is checked, in a second step, which of the exhaust-gas recirculation systems formed by the respective exhaust-gas recirculation duct, along with its exhaust-gas recirculation valve and its drive circuit, is (are) defective, by determining the first value and the second value of the pollutant level and comparing the for all of the exhaust-gas recirculation ducts. In this manner, a two-step method for detecting a defective exhaust-gas recirculation system may be implemented. In a first step, it is checked in a completely general manner, if a defect of the exhaust-gas recirculation system is present at all. This test may be conducted in a comparatively simple manner as a function of the pressure in the at least one air-supply duct. The second, somewhat more complicated step of the method is only executed for the case in which a defect of the exhaust-gas recirculation system was already detected in the first step. Using the second step, the location of the defect may then be detected more accurately, in particular when a multibranch exhaust-gas system having several exhaust-gas recirculation ducts and exhaust-gas recirculation valves is used.

A further advantage may be attained, when the at least one adsorption catalyst is regenerated in the second operating state, and when a second value of the pollutant level in the at least one adsorption catalyst is ascertained from the amount of exhaust gas required for regeneration. In this manner, the second value of the pollutant level may be ascertained in a particularly simple manner, using the regenerating phase of the at least one adsorption catalyst.

BRIEF DESCRIPTION OF THE DRAWINGS

An exemplary embodiment of the present invention is shown in the figures and explained in detail below.

DETAILED DESCRIPTION OF EXAMPLE EMBODIMENTS

Figure 1:
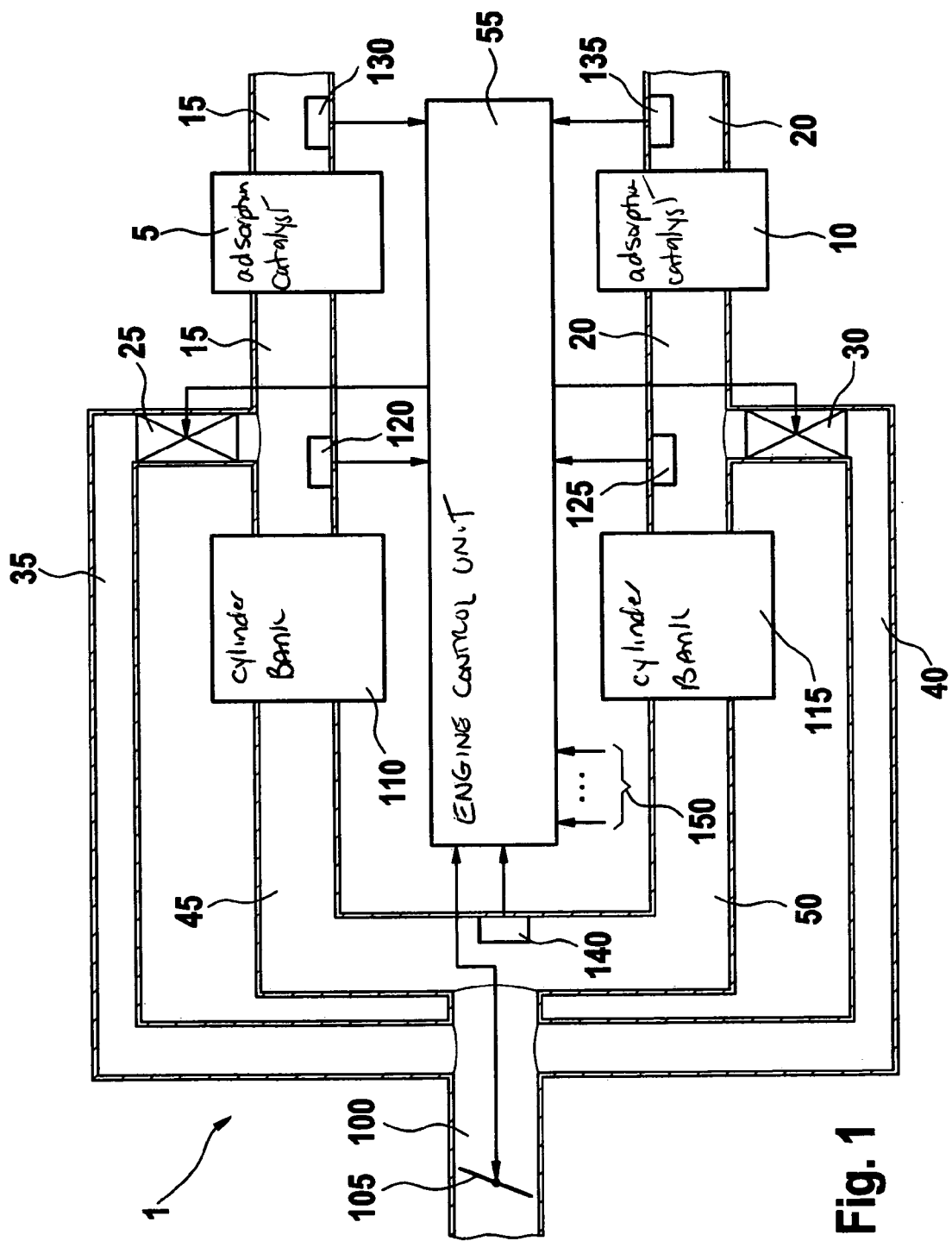
FIG. 1 shows a schematic view of an internal combustion engine having a two-branch exhaust-gas system.

In FIG. 1, reference numeral 1 denotes an internal combustion engine, which may take the form of a spark-ignition engine or a diesel engine. Internal combustion engine 1 includes a first cylinder bank 110 and a second cylinder bank 115. Air is supplied to first cylinder bank 110 via a first air-supply duct 45. Air is supplied to second cylinder bank 115 via a second air-supply duct 50. The two air-supply ducts 45, 50 are provided with fresh air by a common air duct 100. A throttle valve 105 may be positioned, for example, in common air duct 100, as shown in FIG. 1, in order to alter the supply of air to cylinder banks 110, 115. In this context, the degree of opening of throttle valve 105 is controlled by an engine control unit 55, in order to carry out, for example, a driver's command via manipulation of an accelerator pedal in the case in which internal combustion engine 1 propels a vehicle. Conversely, a positional signal regarding the degree of opening of throttle valve 105 may be fed back to engine control unit 55, e.g., using a potentiometer that detects the degree of opening of throttle valve 105. The control and feedback of throttle valve 105 are symbolized by a double arrow between throttle valve 105 and engine control unit 55 in FIG. 1. In addition, a pressure sensor 140 may be installed downstream from throttle valve 105 in common air duct 100, as shown in FIG. 1, or in one of the two air-supply ducts 45, 50, in order to measure the so-called intake-manifold pressure and transmit it to engine control unit 55. For reasons of clarity, the injection of fuel for cylinder banks 110, 115 and, in the case of a spark-ignition engine, the ignition of the air-fuel mixture in the cylinders of cylinder banks 110, 115, are not represented in FIG. 1. The exhaust gas formed during the combustion of the air-fuel mixture in the cylinders of first cylinder bank 110 is discharged into a first exhaust branch 15. An adsorption catalyst 5, e.g., an NOx adsorption catalyst, is situated in first exhaust branch 15. This is particularly used for storing nitrogen oxides, NOx. Situated upstream from first adsorption catalyst 5 in the first exhaust branch is a first exhaust-gas sensor 120, in particular a continuous oxygen sensor, which measures the oxygen concentration in the exhaust gas upstream from first adsorption catalyst 5 and transmits the measuring result to engine control unit 55. In addition, a first exhaust-gas recirculation duct 35 having a first exhaust-gas recirculation valve 25 branches off from exhaust branch 15 upstream from first adsorption catalyst 5, the first exhaust-gas recirculation duct emptying, in turn, into common air duct 100 downstream from throttle valve 105. The degree of opening of first exhaust-gas recirculation valve 25 is controlled by engine control unit 55, in order to select a predefined exhaust-gas recirculation rate as a function of the current operating state of internal combustion engine 1, in a conventional manner. Positioned downstream from first adsorption catalyst 5 is a third exhaust-gas sensor 130, which may take the form of, e.g., an oxygen sensor having a two-point characteristic or an NOx sensor, and generates a measuring signal as a function of the oxygen concentration and/or the NOx concentration of the exhaust gas downstream from first adsorption catalyst 5, and transmits the measuring signal to engine control unit 55. The exhaust gas produced by the cylinders of the second cylinder bank during the combustion of the air-fuel mixture is correspondingly discharged into a second exhaust branch 20. Situated in second exhaust branch 20 is a second adsorption catalyst 10, which, in this example, also stores the nitrogen oxides of the exhaust gas. Positioned in second exhaust branch 20 upstream from second adsorption catalyst 10 is a second exhaust-gas sensor 125, which takes the form of, e.g., a continuous oxygen sensor and measures the oxygen concentration in the exhaust gas and transmits the measuring result to engine control unit 55. A second exhaust-gas recirculation duct 40 having a second exhaust-gas recirculation valve 30 also branches off from second exhaust branch 20 upstream from second adsorption catalyst 10 and empties into common air duct 100 downstream from throttle valve 105. The degree of opening of second exhaust-gas recirculation valve 30 is likewise controlled by engine control unit 55 to attain the desired exhaust-gas recirculation rate in a manner known to one skilled in the art. Situated downstream from second adsorption catalyst 10 is a fourth exhaust-gas sensor 135, which may take the form of, e.g., an oxygen sensor having a two-point characteristic or an NOx sensor, and measures the oxygen concentration or the NOx concentration in the exhaust gas downstream from second adsorption catalyst 10 and transmits a measuring signal to engine control unit 55 as a function of the measuring result. Further input variables of engine control unit 55 are denoted by reference numeral 150 in FIG. 1.

Internal combustion engine 1 is now operated as follows: in a first operating state, the two exhaust-gas recirculation valves 25, 30 are at least partially open, in order to set a predefined exhaust-gas recirculation rate. In this context, the first operating state is characterized in that internal combustion engine 1 is operated with a lean mixture, i.e., the lambda value ascertained by first oxygen sensor 120 and the lambda value ascertained by second oxygen sensor 125 are each greater than 1. The nitrogen oxides in the exhaust gas of the two exhaust branches 15, 20 are stored by adsorption catalysts 5, 10. In this analysis, it was exemplarily assumed that first exhaust-gas sensor 120 takes the form of a first, continuous oxygen sensor 120 and second exhaust-gas sensor 125 takes the form of a second, continuous oxygen sensor 125. This is also exemplarily assumed in the following. Furthermore, it shall be exemplarily assumed in the following that third exhaust-gas sensor 130 takes the form of a first NOx sensor and that fourth exhaust-gas sensor 135 takes the form of a second NOx sensor. A first threshold value of the NOx concentration in the exhaust gas is specified for first NOx sensor 130 and second NOx sensor 135, first NOx sensor 130 and second NOx sensor 135 transmitting a corresponding switching signal to engine control unit 35 when the first threshold value is reached. In this context, the first predefined threshold value of the NOx concentration in the exhaust gas may result, for example, from legal regulations. If the threshold value of the NOx concentration in the exhaust gas is reached or exceeded in one of the two exhaust branches 15, 20, then it is detected that corresponding adsorption catalyst 5, 10 for this exhaust branch is full and must be regenerated. In this exemplary embodiment, regeneration is always carried out for the two adsorption catalysts 5, 10, even when engine control unit 55 has only detected a full adsorption catalyst on one of the two cylinder banks 110, 115, via the switching signal of corresponding NOx sensor 130, 135. In a second operating state of internal combustion engine 1, the two adsorption catalysts 5, 10 are then regenerated by completely closing the two exhaust-gas recirculation valves 25, 30 and operating internal combustion engine 1 with a rich mixture. This means that the two oxygen sensors 120, 125 of engine control unit 55 supply a lambda value less than 1. Adsorption catalysts 5, 10 are regenerated by operating internal combustion engine 1 with a rich mixture; that is, the nitrogen oxide stored in adsorption catalysts 5, 10 is reduced to nitrogen and carbon dioxide, as is described in PCT Application WO 02/14659. To detect the end of regeneration, the NOx signal is not used, but rather the signal of the two NOx sensors 130, 135 having a two-point characteristic.

The end of regeneration is detected, when the rich-gas concentration in the exhaust gas measured by the signal of the two NOx sensors 130, 135 having a two-point characteristic exceeds a second specified threshold value. In this case, as soon as engine control unit 55 has received the corresponding switching signals of the two NOx sensors 130, 135, which denote the end of regeneration for the two adsorption catalysts 5, 10, engine control unit 55 switches into the first operating state, i.e., the lean operation of internal combustion engine 1, exhaust-gas recirculation valves 25, 30 being at least partially open.

According to FIG. 1, a first exhaust-gas recirculation system is formed by first exhaust-gas recirculation duct 35 and first exhaust-gas recirculation valve 25, and the drive circuit of the first exhaust-gas recirculation valve is formed by engine control unit 55. A second exhaust-gas recirculation system is formed by second exhaust-gas recirculation duct 40 and second exhaust-gas recirculation valve 30, while its drive circuit is formed by engine control unit 55. The example embodiment of the present invention now provides for the two exhaust-gas recirculation systems to be diagnosed and/or adapted with the aid of the nitrogen-oxide levels of the two adsorption catalysts 5, 10 ascertained in the two mentioned operating states of internal combustion engine 1. As is described in, for example, PCT Application WO 02/14659, a so-called nitrogen-oxide storage model may be used for ascertaining the NOx level of an NOx adsorption catalyst. In this context, NOx storage models are generally known from the related art. In a nitrogen-oxide storage model, the NOx level may be modeled from parameters describing the operating point of internal combustion engine 1, such as the supplied mass of fuel or mass of air, the torque, etc. In this context, for the case of the two-branch exhaust-gas system shown in FIG. 1, the nitrogen-oxide storage model may be adapted for each of adsorption catalysts 5, 10, e.g., on a test bench, an adjustment being able to be made between, on one hand, the modeling and, for example, the nitrogen-oxide input into specific adsorption catalyst 5, 10, which is measured on the test bench with the aid of a nitrogen-oxide sensor. In this context, the modeling may initially be based on the assumption that the two air and exhaust-gas systems, as well as the two cylinder banks 110, 115 and, in particular, the two adsorption catalysts 5, 10, are symmetrically constructed and have the same characteristics. In this manner, the mass of nitrogen stored by the entire system, i.e., by the two adsorption catalysts 5, 10, may be ascertained according to the conventional nitrogen-oxide storage model and then divided in two among the two adsorption catalysts 5, 10. By adapting this to the inputted amounts of nitrogen-oxide actually measured on the test bench, differently adapted nitrogen-oxide storage models may then be generated for the two adsorption catalysts 5, 10. The parameters used for the modeling, as described in, e.g., PCT Application WO 02/14659, are determined by engine control unit 55 or calculated from additional input variables 150. These parameters include, as described, e.g., the supplied mass of fuel and mass of air, the torque output by internal combustion engine 1, etc.

The example embodiment of the present invention now provides for the amount of nitrogen oxide stored in each of adsorption catalysts 5, 10 during the first operating state, i.e., the lean operation of internal combustion engine 1, to be modeled in the described manner. If, at the end of the first operating state, i.e., at the end of the lean operating phase of internal combustion engine 1, regeneration of adsorption catalysts 5, 10 is called for, initiated by the switching signal of one of the two NOx sensors 130, 135, then the amount of nitrogen oxide stored in this instant is ascertained by engine control unit 55 for each adsorption catalyst 5, 10, using the described modeling, and the ascertained values are stored. In this context, the amount of nitrogen oxide stored in first adsorption catalyst 5 is referred to in the following by NOx_B1, and the amount of nitrogen oxide stored in second adsorption catalyst 10 is referred to by NOx_B2.

In addition, PCT Application WO 02/14659 described that the nitrogen-oxide level of a nitrogen-oxide adsorption catalyst can be determined with the aid of a discharge model. In this context, a mass flow rate of reducing agent is determined from the composition of the fuel-air mixture and a mass flow rate of air supplied to internal combustion engine 1 for combustion. Using a temperature-dependent factor, this is converted to a mass flow rate, as a function of which a reduction in the NOx stored in the NOx adsorption catalyst during lean operation of the internal combustion engine is calculated. The disadvantage of this modeling is that it is relatively inaccurate. The reason for this is that, in particular, during the regenerating phase, the reducing agent reduces, in addition to the stored NOx, the oxygen likewise stored in the adsorption catalyst. The stored gas, NOx or oxygen, which is then actually reduced at a particular time during the regenerating phase, is a function of the construction type of the NOx adsorption catalyst. In this context, PCT Application WO 02/14659 proposes that the oxygen trap of the adsorption catalyst be modeled by a first integrator for oxygen, and that the nitrogen-oxide trap of the adsorption catalyst be modeled by a second integrator for nitrogen oxides, and that the first integrator and the second integrator be proportionally acted upon by the mass flow of reducing agent according to a distribution factor, the distribution factor being determined as a function of the oxygen storage capacity and the nitrogen-oxide storage capacity of the adsorption catalyst. In PCT Application WO 02/14659, starting out from the level of the adsorption catalyst at the end of the lean phase, the portion of nitrogen oxide reduced by the mass flow of reducing agent is integrated down to a level of zero, using negative integration, in order to detect the end of regeneration. However, this integration may additionally be reversed without any problem, in that the mass flow rate of reducing agent required for reducing the nitrogen oxide stored in the adsorption catalysts is also integrated in view of the distribution factor and, therefore, in view of the reduction of oxygen according to WO 02/14659, in order to ultimately ascertain the entire level of nitrogen oxide reduced during the regenerating phase, i.e., up to the end of the regenerating phase, for each of the two adsorption catalysts 5, 10. In this context, the mass flow rate of reducing agent for the two exhaust branches 15, 20 may easily be determined with the aid of the two continuous oxygen sensors 120, 125. According to PCT Application WO 02/14659, the mass flow rate of reducing agent is a function of the mass flow rate of exhaust gas and the lambda value. Therefore, to determine the mass flow rate of reducing agent for the two adsorption catalysts 5, 10, only the mass flow rate of exhaust gas in the two exhaust branches 15, 20 must be determined, either by measurement or by modeling in a manner known to one skilled in the art, whereas the respective lambda value is ascertained by the two oxygen sensors 120, 125. In this context, the mass flow rate of exhaust gas in specific exhaust branch 15, 20 may likewise be determined according to PCT Application WO 02/14659, from the mass flow rate of air supplied to each cylinder bank 110, 115, as well. To this end, this mass flow rate of air must be measured exactly or modeled in a manner known to one skilled in the art. PCT Application No. WO 02/14659 also describes that, while taking an efficiency into account, the entire mass flow rate of reducing agent can be converted into an effective mass flow rate of reducing agent, which actually takes part in converting the stored components of nitrogen oxide and oxygen. Regarding this efficiency, the fact can be taken into account that, during the regenerating phase in the adsorption catalyst, not all of the mass flow of reducing agent encounters nitrogen oxide to be reduced or oxygen to be reduced, but a portion of the entire mass flow of reducing agent leaves the adsorption catalyst again without having reacted with nitrogen oxide or oxygen. In this context, the efficiency is ascertained from the mass flow rate of exhaust gas, using an applied characteristic curve. This may be empirically determined in the preliminary stages of the modeling. In the case of the two-branch exhaust-gas system according FIG. 1, this efficiency may be correspondingly and empirically determined for the two adsorption catalysts 5, 10 in the described manner. Instead of using, in each instance, the entire mass flow of reducing agent, the quantities of nitrogen oxide reduced during the regenerating phase of adsorption catalysts 5, 10 are then calculated in a corresponding manner by integrating the respective, effective mass flow rate of reducing agent. The determination of the quantities of nitrogen oxide reduced in first adsorption catalyst 5 and second adsorption catalyst 10 during the regenerating phase can be more accurate, when the temperature dependence of the oxygen storage capacity of specific adsorption catalyst 5, 10 is taken into account, as is described in PCT Application WO 02/14659.

Therefore, in the regeneration of the two adsorption catalysts 5, 10 carried out after the lean operating phase of internal combustion engine 1, during the second operating state of internal combustion engine 1, the quantities of nitrogen oxide NOx_Reg_B1 and NOx_Reg_B2 reduced up to the end of the regenerating phase, i.e., up to the second operating state, are ascertained for first adsorption catalyst 5 and second adsorption catalyst 10, respectively, in the described manner for each of the two adsorption catalysts 5, 10, from the respective, required amount of rich exhaust gas, i.e., from the respective, required amount of mass flow of reducing agent, in view of the oxygen storage capacity of the two adsorption catalysts 5, 10. As described, the end of regeneration is detected when engine control unit 55 receives the two switching signals of the two NOx sensors 130, 135. The first operating state, i.e., the lean operating phase of internal combustion engine 1, is then activated again by the engine control unit 55, while exhaust-gas recirculation valves 25, 30 are at least partially opened.

Therefore, comparable values for the nitrogen-oxide level in each adsorption catalyst 5, 10 are obtained in the two different operating states of internal combustion engine 1. The reason for this is that the nitrogen-oxide level of the two adsorption catalysts 5, 10 is ascertained in the first operating state of internal combustion engine 1, i.e., in the lean operating phase, based on the nitrogen-oxide concentration in the exhaust-gas stream downstream from the two adsorption catalysts 5, 10, which approximately corresponds to the first specified threshold value at the end of the lean operating phase. In the regeneration phase that directly follows, i.e., in the second operating state of internal combustion engine 1, the level of nitrogen oxide in the two adsorption catalysts 5, 10 is then ascertained, which is reduced again until the second specified threshold value for the rich-gas concentration in the exhaust-gas stream downstream from the two adsorption catalysts 5, 10 is reached. Therefore, the two operating states of internal combustion engine 1 have approximately the same limits with respect to the nitrogen-oxide concentration in the exhaust-gas stream downstream from the two adsorption catalysts 5, 10, since at the end of the regenerating phase, one obtains a nitrogen-oxide level in adsorption catalysts 5, 10, which corresponds to the nitrogen-oxide level in adsorption catalysts 5, 10 at the beginning of the lean phase, which means that the nitrogen-oxide level built up in the two adsorption catalysts 5, 10 during the lean operating phase is comparable to the level of nitrogen oxide of the two adsorption catalysts 5, 10 reduced in the corresponding regenerating phase.

If one now compares, for each of the two adsorption catalysts 5, 10, the level of nitrogen-oxide stored in each adsorption catalyst 5, 10 during the first operating state of internal combustion engine 1 to the level of nitrogen oxide reduced in each adsorption catalyst 5, 10 during the second operating state of the internal combustion engine, then, for each of the two exhaust-gas recirculation systems, one may make an assertion regarding their defectiveness. The reason for this is that, in particular, exhaust-gas recirculation valves 25, 30 are at least partially open during the first operating state, while they are completely closed during the second operating state. Therefore, if the modeled value for the amount of nitrogen oxide stored in one of the two adsorption catalysts 5, 10 at the end of the first operating state of internal combustion engine 1 differs from the nitrogen-oxide amount of corresponding adsorption catalyst 5, 10 up to the end of the subsequent, second operating state of internal combustion engine 1, then it can be concluded that there is an exhaust-gas recirculation system defect in the exhaust-gas recirculation system in the corresponding exhaust branch, in particular when the absolute value of the difference exceeds a first specified threshold value.

In the following, for the sake of simplicity, the modeled value of the amount of nitrogen oxide stored in an adsorption catalyst up to the end of the first operating state is designated as the first value of the pollutant level in the corresponding adsorption catalyst.

The obtained and ascertained amount of nitrogen oxide of the corresponding adsorption catalyst reduced up to the end of the subsequent second operating state is then referred to as the second value of the pollutant level of the corresponding adsorption catalyst. Therefore, NOx_B1 represents a first value of the pollutant level of first adsorption catalyst 5, and NOx_Reg_B1 represents a second value of the pollutant level of first adsorption catalyst 5. Value NOx_B2 represents a first value of the pollutant level of second adsorption catalyst 10, while value NOx_Reg_B2 represents a second value of the pollutant level of second adsorption catalyst 10.

Therefore, if first value NOx_B1 for the pollutant level of first adsorption catalyst 5 is not equal to second value NOx_Reg_B1 for the pollutant level of first adsorption catalyst 5, then it can be deduced that there is a discrepancy between a predefined, desired mass flow rate of recirculated exhaust gas and the actual mass flow rate of recirculated exhaust gas in first exhaust-gas recirculation duct 35. Accordingly, when first value NOx_B2 of the pollutant level of second adsorption catalyst 10 is not equal to second value NOx_Reg_B2 of the pollutant level of second adsorption catalyst 10, one may conclude that there is a discrepancy between a predefined, desired mass flow rate of recirculated exhaust gas and an actual mass flow rate of recirculated exhaust gas in second exhaust-gas recirculation duct 40. The individual exhaust-gas recirculation systems may be diagnosed for defects in this manner. In order to take measuring and modeling inaccuracies into consideration, it may be provided that the defect of one of the two exhaust-gas recirculation systems is only detected when the absolute value of the deviation of the first value for the pollutant level of the corresponding adsorption catalyst from the second value for the pollutant level of the corresponding adsorption catalyst is greater than the first predefined threshold value for this difference. Asymmetry between the two exhaust-gas recirculation systems is then detected, when the difference between the first value for the pollutant level of first adsorption catalyst 5 and the second value of the pollutant level of first adsorption catalyst 5 is different from the difference between the first value for the pollutant level of second adsorption catalyst 10 and the second value for the pollutant level of second adsorption catalyst 10. In this context, it may be provided that the asymmetry of the two exhaust-gas recirculation systems is only detected when the absolute value of the difference of the two named differences exceeds a second predefined threshold value, in order to take into consideration model and measuring inaccuracies in this case, as well. Alternatively, it may be provided that the asymmetry of the exhaust-gas recirculation system is only detected when the difference between the first value of the pollutant level and the second value of the pollutant level has a different sign for at least two of the exhaust-gas recirculation ducts.

Asymmetric recirculation of exhaust gas via the two exhaust-gas recirculation ducts 35, 40, i.e., exhaust-gas recirculation in which the mass flow rates of recirculated exhaust gas in the two exhaust-gas recirculation ducts 35, 40 are different, is especially detected, when NOx_Reg_B1 is greater than NOx_B1 and NOx_Reg_B2 is less than NOx_B2, or vice versa. It is also possible to conclude that the exhaust-gas recirculation is asymmetric, when NOx_B1 is approximately equal to NOx_B2, but NOx_Reg_B1 and NOx_Reg_B2 sharply deviate from each other. The last logic circuit only assesses the relation of the nitrogen-oxide amounts in first adsorption catalyst 5 and in second adsorption catalyst 10 and therefore has the advantage of being independent of the uncertainty in the modeling of the absolute quantities of stored nitrogen oxide in the two adsorption catalysts 5, 10.

As an option, it may also be provided that the diagnosis of the exhaust-gas recirculation system be carried out in two steps. In a first step, as is described in German Patent Application DE 100 41 073 A1 and DE 101 15 750 A1, a diagnosis of the entire exhaust-gas recirculation system, i.e., the two exhaust-gas recirculation systems of FIG. 1, is carried out as a function of the intake pressure in common air duct 100 ascertained by pressure sensor 140 and the intake pressure modeled from other operating parameters of internal combustion engine 1 in a manner known to one skilled in the art. If no defect of the exhaust-gas recirculation system is detected during this diagnosis, then a more extensive diagnosis of the exhaust-gas recirculation system is not carried out. In the case in which, during the above-mentioned diagnosis, a defect of the entire exhaust-gas recirculation, i.e., the two exhaust-gas recirculation systems, is detected, only then is it checked, in the described manner, which exhaust-gas recirculation system(s) formed by specific exhaust-gas recirculation duct 35, 40, along with its exhaust-gas recirculation valve 25, 30 and its drive circuit, is (are) defective, by ascertaining, in a second step, the first value and the second value for the pollutant level of the two adsorption catalysts 5, 10 and comparing them for the two exhaust-gas recirculation ducts 35, 40.

Figure 2:
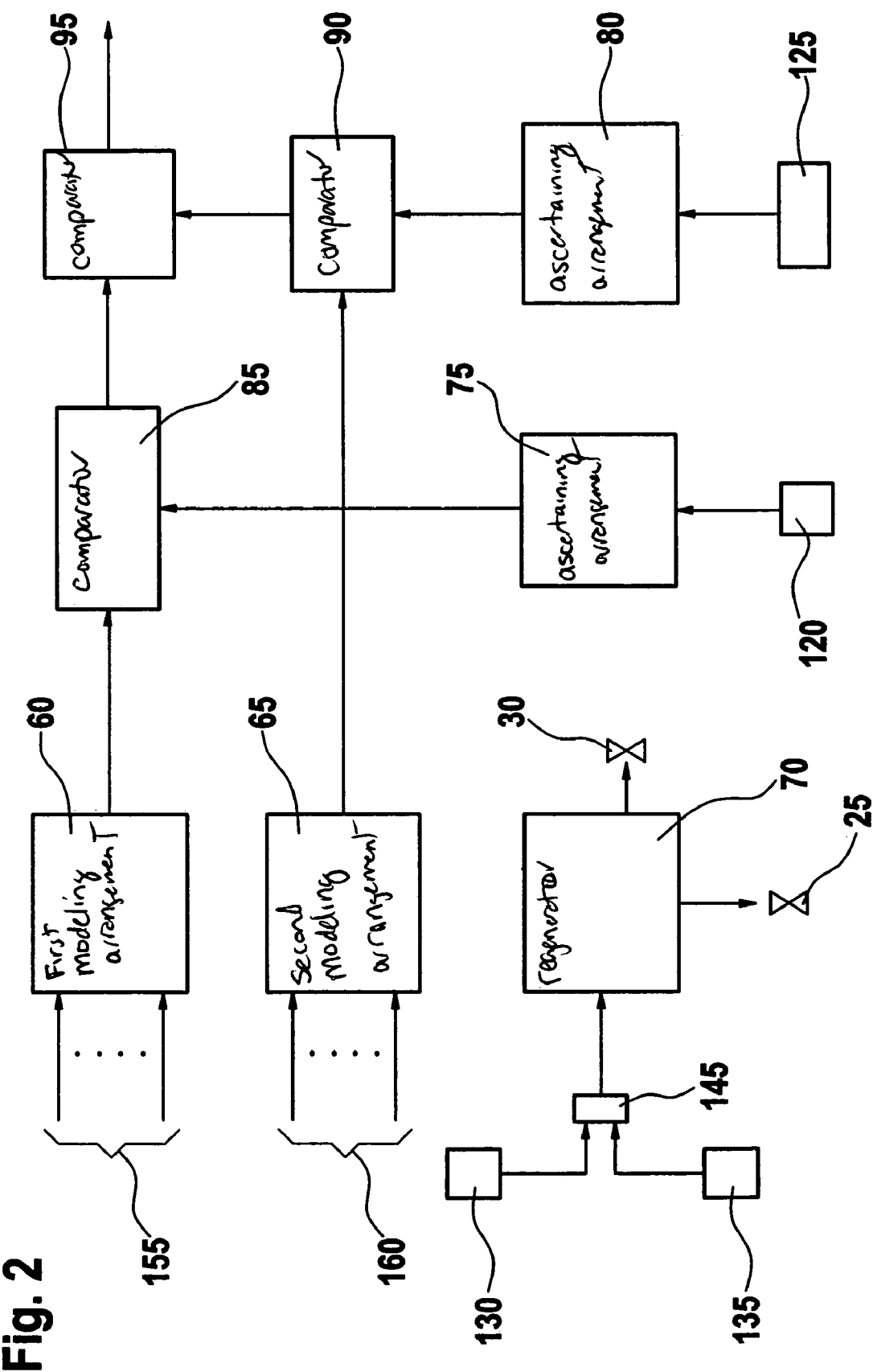
FIG. 2 shows a flow chart for illustrating an example method and device of the present invention.

Shown in FIG. 2 is a flow chart for illustrating the method of the present invention and the device of the present invention. The flowchart shown may be implemented in the form of software and/or hardware in engine control unit 55, which may embody the device according to the present invention. In this context, first modeling arrangement 60 is provided, which ascertain first value NOx_B1 for the level of first adsorption catalyst 5 up to the end of the first operating state as a function of first input variables 155, such as the mass of fuel supplied to first cylinder bank 110 or the mass of air supplied to first cylinder bank 110 via first air-supply duct 55, the torque contribution of internal combustion engine 1 caused by first cylinder bank 110, etc., in the described manner. This first value NOx_B1 is transmitted to first comparator 85. In addition, two modeling arrangements 65 are provided, which ascertain the first value for the pollutant level of second adsorption catalyst 10 in the described manner, at the end of the first operating state, as a function of second input variables, such as the mass of fuel supplied to second cylinder bank 115 or the mass of air supplied to second cylinder bank 115 via second air-supply duct 50, the torque contribution of second cylinder bank 115, etc., and output the first value of the pollutant level of second adsorption catalyst 10 to second comparison means 90. In addition, regenerator 70 is provided, to which a trigger signal may be transmitted via an OR-gate 145. The input variables of OR-gate 145 are the measuring signals of the two NOx sensors 130, 135. The two output signals of NOx sensors 130, 135 are reset during the first operating state of internal combustion engine 1, which means that the output signal of OR-gate 145 is also reset and the regenerator is not activated. As soon as one of the two NOx sensors 130, 135 detects, in the course of the first operating-state, an NOx concentration above the first predefined threshold value in the exhaust-gas stream, downstream from corresponding adsorption catalyst 5, 10, the signal of the one NOx sensor outputted to OR-gate 145 is set, and consequently, the output of OR-gate 145 is set as well. In this manner, regenerator 70 is activated and the second operating state of internal combustion engine 1 started, in which exhaust-gas recirculation valves 25, 30 are brought from their at least partially open position in the first operating state into their closed position and, therefore, the internal combustion engine is operated in the second operating state. Only when the signals of the two NOx sensors 130, 135, having a two-point characteristic, exceed the second predefined threshold value, is the output of OR-gate 145 reset again and the regenerating state consequently ended and a switchover again made into the first operating state of internal combustion engine 1, where exhaust-gas recirculation valves 25, 30 are at least partially open. First modeling arrangement 60 and second modeling arrangement 65 are active in the first operating state of internal combustion engine 1. In the second operating state of internal combustion engine 1, first ascertaining arrangement 75 and second ascertaining means 80 are active. The output signal of first oxygen sensor 120 is supplied to first ascertaining arrangement 75. In addition, first ascertaining arrangement 75 is supplied one or more additional input variables in a manner not shown in FIG. 2, the mass flow rate of the exhaust gas in first exhaust branch 15 being determined from the one or more input variables. Furthermore, the temperature downstream from first adsorption catalyst 5 may be supplied to first ascertaining arrangement 75 by, for example, a temperature sensor downstream from first adsorption catalyst 5. As an alternative, this temperature may also be modeled in a conventional manner, from operating parameters of internal combustion engine 1 supplied to first ascertaining arrangement 75. Then, first ascertaining arrangement 75 ascertains second value NOx_Reg_B1 for the pollutant level of first adsorption catalyst 5 in the described manner, in particular in view of the mentioned efficiency. This value is likewise supplied to first comparator 85. Second ascertaining arrangement 80 ascertains second value NOx_Reg_B2 for the pollutant level of second adsorption catalyst 10 from the corresponding variables for second exhaust branch 20, and in particular from the output signal of second oxygen sensor 125, and transmit the second value to second comparator 90. The first and second values of the pollutant level in the two adsorption catalysts 5, 10 are temporarily stored in comparators 85, 90 prior to their comparison, since they are not ascertained simultaneously. Thus, the first values for the pollutant level of the two adsorption catalysts 5, 10 are ascertained by first and second modeling arrangements 60, 65 during the first operating state, and the second values for the pollutant level of the two adsorption catalysts 5, 10 are ascertained during the directly following, second operating state of internal combustion engine 1. First comparison arrangement 85 calculates the difference of the first value and second value for the pollutant level of first adsorption catalyst 5 and detects an error of the first exhaust-gas recirculation system having first exhaust-gas recirculation duct 35, when the absolute value of the difference is greater than the first threshold value specified for it. In this context, the calculated difference is also transmitted to third comparison arrangement 95 without calculating the absolute value. Second comparator 90 calculates the difference of the first and second values of second adsorption catalyst 10 and detects an error of the second exhaust-gas recirculation system having second exhaust-gas recirculation duct 40, when the absolute value of this difference is, in turn, greater than the mentioned, first predefined threshold value. The difference itself is likewise transmitted to third comparator 90 without calculating the absolute value. In a manner that is uniform for each of the adsorption catalysts considered, the differences transmitted to third comparator 95 are either equal to the first value minus the second value for the pollutant level of the corresponding adsorption catalyst or, conversely, equal to the second value minus the first value for the pollutant level of the corresponding adsorption catalyst. Third comparator 95 calculates, in turn, the difference of the supplied differences. If the absolute value of this resulting difference is greater than the second threshold value specified for this, then asymmetry of the two exhaust-gas recirculation systems is detected. An error signal is emitted accordingly. The two comparators 85, 90 may also emit an error signal in response to the detection of a defect of the corresponding exhaust gas recirculation system, which is not shown in FIG. 2 for reasons of clarity. The error signals may result in the activation of a warning light or the initiation of-an emergency-operation measure of internal combustion engine 1.

In addition to the described error diagnosis, it is also possible that, when a defect of one or more exhaust-gas recirculation systems is detected, corresponding exhaust-gas recirculation valve(s) 25, 30 can be controlled in such a modified manner, e.g., with the aid of a control system, that the defect is minimized or eliminated. In this manner, the control of corresponding exhaust-gas recirculation valve(s) 25, 30 may be corrected or adapted to prevent defects. Of course, only the exhaust-gas recirculation valve(s) must be corrected, whose corresponding exhaust-gas recirculation systems were determined to be defective in the described manner.

The described error-diagnosis method may be clearly explained, as follows. If one of the two exhaust-gas recirculation ducts 35, 40 becomes clogged, e.g., first exhaust-gas recirculation duct 35, then less exhaust gas is recirculated from first exhaust branch 15 than from second exhaust branch 20. Accordingly, more nitrogen-oxide-containing exhaust gas remains in first exhaust branch 15. As a result, first adsorption catalyst 5 is filled with nitrogen oxides more rapidly than second adsorption catalyst 10. During the second operating state, it is then detected that more nitrogen oxides were stored in first adsorption catalyst 5 than in second adsorption catalyst 10. However, the described blockage of first exhaust-gas recirculation duct 35 cannot be detected from the modeling of the amount of nitrogen oxide stored in first adsorption catalyst 5 and in second adsorption catalyst 10, which means that during the first operating state, approximately the same stored amount of nitrogen oxide is ascertained for the two adsorption catalysts 5, 10. Asymmetry of the two exhaust-gas recirculation systems may then be deduced from the discrepancy of the nitrogen-oxide amounts in the two adsorption catalysts 5, 10 then ascertained in the second operating state.

The example embodiment of the present invention was described on the basis of an internal combustion engine having a two-branch exhaust system. It may also be applied in a corresponding manner to internal combustion engines having an exhaust system containing more than two branches. In this context, the individual exhaust-gas recirculation systems may be tested for defects in the described manner, whereas asymmetry of the different exhaust-gas recirculation systems is then detected, when the absolute value of the difference of the first and the second values of the pollutant level of the corresponding adsorption catalyst of at least two of the exhaust-gas recirculation systems is greater than the second threshold value specified for this. As an alternative, the method of the present invention may also be implemented for internal combustion engines having only a single exhaust branch and a single exhaust-gas recirculation system, in order to detect a defect of this exhaust-gas recirculation system in the described manner on the basis of the difference between the first and second predefined values for the pollutant level in the adsorption catalyst. This also applies in a corresponding manner to internal combustion engines having a two-branch or multi-branch exhaust system, in which, however, there is only an exhaust-gas recirculation system for a single one of the exhaust branches.

Therefore, the example method and device of the present invention may allow all of the exhaust-gas recirculation systems to be diagnosed and/or adapted, in particular in the case of an internal combustion engine having several exhaust-gas recirculation systems, i.e., several separate exhaust-gas recirculation ducts and exhaust-gas recirculation valves.

What is claimed is:

1. A method for operating an internal combustion engine having at least one adsorption catalyst in at least one exhaust branch, and having at least one exhaust-gas recirculation duct, which has an exhaust-gas recirculation valve and feeds exhaust gas from the at least one exhaust branch back into at least one air-supply duct, the method comprising:
  ascertaining a concentration of pollutant stored in the at least one adsorption catalyst in a first operating state of the internal combustion engine when the exhaust-gas recirculation valve is at least partially open, to yield a first value for a pollutant level;

ascertaining, in a second operating state of the internal combustion engine, a second value for the pollutant level in the at least one adsorption catalyst when the exhaust-gas recirculation valve is closed;

comparing the first value of the pollutant level to the second value of the pollutant level; and carrying out at least one of a diagnosis and an adaptation of an exhaust-gas recirculation system formed by the at least one exhaust-gas recirculation duct, along with the exhaust-gas recirculation valve and drive circuit, as a function of the comparing.

2. The method as recited in claim 1, further comprising:

detecting a defect of the exhaust-gas recirculation system when an absolute value of a deviation of the first value for the pollutant level from the second value for the pollutant level is greater than a first predefined threshold value.

3. The method as recited in claim 1, wherein, the at least one exhaust branch includes a plurality of exhaust branches, each having a respective exhaust-gas recirculation duct, the method further comprising:

detecting asymmetric exhaust-gas recirculation via the exhaust-gas recirculation ducts when a difference between the first value of the pollutant level and the second value of the pollutant level is different for at least two of the exhaust-gas recirculation ducts.

4. The method as recited in claim 3, wherein the asymmetry of the exhaust-gas recirculation system is detected only when an absolute value of the difference exceeds a second predefined threshold value.

5. The method as recited in claim 3, wherein the asymmetry of the exhaust-gas recirculation system is detected only when the difference between the first value of the pollutant level and the second value of the pollutant level has a different sign for at least two of the exhaust-gas recirculation ducts.

6. The method as recited in claim 3, further comprising:

diagnosing the exhaust-gas recirculation system as a function of a pressure in the at least one air-supply duct;

only in the case in which a defect of the exhaust-gas recirculation system is detected during the diagnosing step, checking which of the exhaust-gas recirculation systems formed by the respective exhaust-gas recirculation duct, the exhaust-gas recirculation valve, and the drive circuit is defective, by determining the first value and the second value of the pollutant level and comparison thereof for all of the exhaust-gas recirculation ducts.

7. The method as recited in claim 1, wherein the at least one adsorption catalyst is regenerated in the second operating state, and a second value for the pollutant level in the at least one adsorption catalyst is ascertained from the amount of exhaust gas needed for regeneration.

8. A device for operating an internal combustion engine having at least one adsorption catalyst in at least one exhaust branch, and having at least one exhaust-gas recirculation duct which is provided with an exhaust-gas recirculation valve and feeds exhaust gas from the at least one exhaust branch back into at least one air-supply duct, the device comprising:

a first ascertaining arrangement configured to determine a concentration of pollutant stored in the at least one adsorption catalyst in a first operating state of the internal combustion engine when the exhaust-gas recirculation valve is at least partially open, so that a first value for the pollutant level is produced;

a second ascertaining arrangement configured to ascertain a second value for the pollutant level in the at least one adsorption catalyst in a second operating state of the internal combustion engine, when the exhaust-gas recirculation valve is closed;

a comparator configured to compare the first value for the pollutant level to the second value for the pollutant level; and a diagnosis arrangement configured to carry out at least one of a diagnosis and an adaptation of an exhaust-gas recirculation system formed by the at least one exhaust-gas recirculation duct, the exhaust-gas recirculation valve, and the drive circuit, as a function of the comparison.

* * * * *